United States Patent
Yamaguchi et al.

(10) Patent No.: US 8,899,309 B2
(45) Date of Patent: Dec. 2, 2014

(54) VENTILATION DEVICE

(75) Inventors: Tsuyoshi Yamaguchi, Sakai (JP);
Kenichi Maegaito, Sakai (JP);
Yoshitaka Matsugi, Sakai (JP)

(73) Assignee: Daikin Industries, Ltd., Osaka-Shi (JP)

( * ) Notice: Subject to any disclaimer, the term of this patent is extended or adjusted under 35 U.S.C. 154(b) by 0 days.

(21) Appl. No.: 13/995,638

(22) PCT Filed: Dec. 19, 2011

(86) PCT No.: PCT/JP2011/007080
§ 371 (c)(1),
(2), (4) Date: Jun. 19, 2013

(87) PCT Pub. No.: WO2012/086172
PCT Pub. Date: Jun. 28, 2012

(65) Prior Publication Data
US 2013/0281001 A1    Oct. 24, 2013

(30) Foreign Application Priority Data
Dec. 20, 2010  (JP) ................. 2010-283425

(51) Int. Cl.
*F24F 7/08* (2006.01)
*F24F 3/147* (2006.01)
*F24F 12/00* (2006.01)
*F24F 13/30* (2006.01)

(52) U.S. Cl.
CPC . *F24F 7/08* (2013.01); *F24F 3/147* (2013.01); *F24F 13/30* (2013.01); *Y02B 30/563* (2013.01); *F24F 12/006* (2013.01); *Y10S 165/909* (2013.01)
USPC ............................ 165/145; 165/909; 165/122

(58) Field of Classification Search
CPC .... F24F 12/001; F24F 12/006; Y02B 30/563; F28D 9/0093
USPC .................................. 165/54, 122, 166, 909
See application file for complete search history.

(56) References Cited

U.S. PATENT DOCUMENTS

| | | | |
|---|---|---|---|
| 1,825,498 A * | 9/1931 | Wogan | 165/157 |
| 3,666,007 A * | 5/1972 | Yoshino et al. | 96/144 |
| 4,550,773 A * | 11/1985 | Martin | 165/54 |
| 5,193,610 A * | 3/1993 | Morissette et al. | 165/54 |

(Continued)

FOREIGN PATENT DOCUMENTS

| | | |
|---|---|---|
| JP | 54-61350 A | 5/1979 |
| JP | 61-10109 Y2 | 4/1986 |

(Continued)

*Primary Examiner* — Allen Flanigan
(74) *Attorney, Agent, or Firm* — Birch, Stewart, Kolasch & Birch, LLP

(57) ABSTRACT

A first element and a second element are disposed in postures such that the length directions of the elements are parallel to each other. The first element is disposed in a posture such that a pair of opposing surfaces where a longitudinal flow passage is open is parallel to one main plate. The second element is disposed in a posture such that a pair of opposing surfaces where a longitudinal flow passage is open is parallel to the one main plate. A mixing flow passage formed as a result of the first element and the second element being disposed with a gap therebetween in a facing direction of side plates is provided between a transverse flow passage of the first element and a transverse flow passage of the second element.

2 Claims, 9 Drawing Sheets

(56) References Cited

U.S. PATENT DOCUMENTS

| | | | |
|---|---|---|---|
| 5,458,187 A * | 10/1995 | Davis | 165/54 |
| 5,660,228 A * | 8/1997 | Steege et al. | 165/76 |
| 5,927,387 A * | 7/1999 | Nystrom | 165/103 |
| 6,612,365 B1 * | 9/2003 | Saishu et al. | 165/54 |
| 7,228,891 B2 * | 6/2007 | Shin et al. | 165/166 |
| 8,267,164 B2 * | 9/2012 | Lestage et al. | 165/200 |
| 2006/0270335 A1 * | 11/2006 | Kim et al. | 454/237 |
| 2011/0036541 A1 | 2/2011 | Takada et al. | |

FOREIGN PATENT DOCUMENTS

| | | |
|---|---|---|
| JP | 5-296512 A | 11/1993 |
| JP | 8-61730 A | 3/1996 |
| JP | 11-294974 A | 10/1999 |
| JP | 2007-285584 A | 11/2007 |
| WO | WO 9010828 A * | 9/1990 |
| WO | WO 2009/128150 A1 | 10/2009 |

\* cited by examiner

VENTILATION DEVICE

TECHNICAL FIELD

The present invention relates to a ventilation device.

BACKGROUND ART

A ventilation device is known that has a total heat exchange element inducing total heat (sensible heat and latent heat) exchange between outdoor air sucked into a case from an outside air suction port and indoor air sucked into the case from a discharge air suction port, and a variety of measures have been used to improve the performance of such a device. For example, Patent Document 1 discloses a ventilation device in which two total heat exchange elements (first element and second element) are arranged adjacent to each other inside the case with the object of improving the performance.

However, when the installation space, such as a space above a ceiling, where the ventilation device is to be installed is narrow, the ventilation device such as described in Patent Document 1 cannot be installed because the size of the case in the thickness direction can easily increase. Therefore, it is necessary to reduce the size of the case in the thickness direction while maintaining the performance of the ventilation device.

Patent Document 1: Japanese Patent Application Publication No. 2007-285584

SUMMARY OF THE INVENTION

It is an object of the present invention to provide a ventilation device in which the size of the case in the thickness direction can be reduced while maintaining the performance.

The ventilation device in accordance with the present invention includes a case (21) and a first element (41) and a second element (42) in the form of a rectangular parallelepiped. The case (21) includes a pair of main plates (22, 23) disposed opposite each other and a pair of side plates (24, 25) disposed opposite each other and connecting end portions of the pair of main plates (22, 23). The first element (41) and the second element (42) are arranged adjacent to each other in a facing direction (D1) of the side plates, in which the pair of side plates (24, 25) face each other, and induce total heat exchange between outdoor air and indoor air. The first element (41) and the second element (42) are of a crossflow type provided with transverse flow passages (F1, F2) constituted by a plurality of through holes extending in the facing direction (D1) of the side plates and longitudinal flow passages (F3, F4) constituted by a plurality of through holes extending in a facing direction (D2) of the main plates, in which the main plates (22, 23) face each other.

The first element (41) and the second element (42) are disposed in postures such that the length directions thereof are parallel to each other. The first element (41) is disposed in a posture such that a pair of opposing surfaces (41C, 41D) where the longitudinal flow passage (F3) is open is parallel to the one main plate (22), and the second element (42) is disposed in a posture such that a pair of opposing surfaces (42C, 42D) where the longitudinal flow passage (F4) is open is parallel to the one main plate (22).

A mixing flow passage (M1) formed as a result of the first element (41) and the second element (42) being disposed with a gap therebetween in the facing direction (D1) of the side plates is provided between the transverse flow passage (F 1) of the first element (41) and the transverse flow passage (F2) of the second element (42).

DESCRIPTION OF EMBODIMENTS

Figure 1:
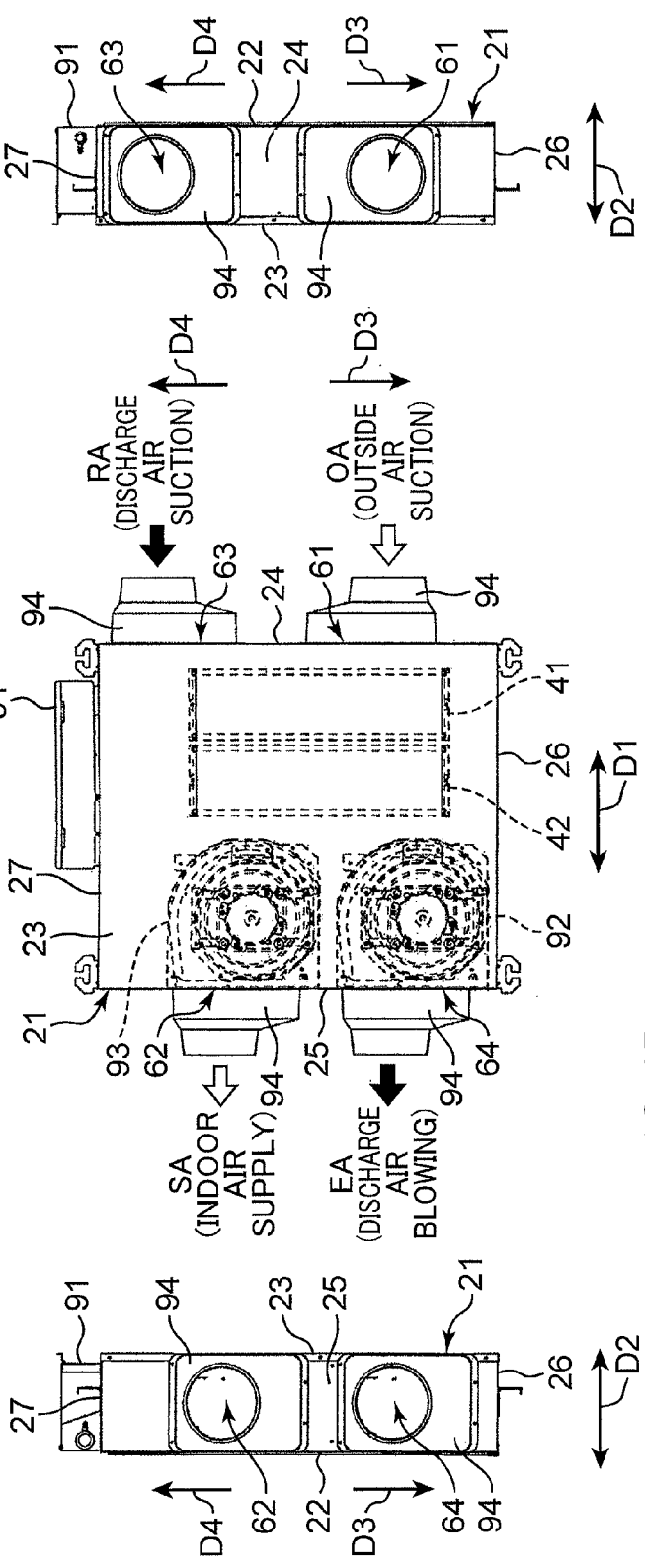
FIG. 1A is a plan view illustrating the ventilation device according to an embodiment of the present invention.
FIG. 1B is a front view thereof.
FIG. 1C is a right side view thereof.
FIG. 1D is a left side view thereof.

A ventilation device 11 according to an embodiment of the present invention will be described below in greater detail with reference to the appended drawings. As shown in FIGS. 1A to 1D, the ventilation device 11 according to the present embodiment is provided with a case 21, a first element 41, a second element 42, fans 92, 93, and a switch box 91.

The case 21 has a substantially rectangular parallelepiped shape. The case 21 includes a pair of main plates 22, 23 (a bottom plate 22 and a top plate 23) disposed opposite each other, and four side plates 24, 25, 26, 27 connecting the end portions of the main plates 22, 23 to each other. The side plate 24 and the side plate 25 face each other in a direction D1. The base plate 22 and the top plate 23 face each other in a direction D2 (thickness direction of the case 21). The side plate 26 and the side plate 27 face each other in a direction (length direction of the first element 41 and the second element 42) perpendicular to the direction D1 and the direction D2. The case 21 has a flat shape such that the size thereof in the direction D2 is less than the size in the direction D1 and the size in the perpendicular direction. The first element 41, second element 42, and fans 92, 93 are disposed inside the case 21. The switch box 91 is mounted on the outer surface of the side plate 27 of the case 21 and has a control unit (not shown in the figure) for controlling the fans 92, 93.

The case 21 has an outside air suction port 61, a discharge air suction port 63, an indoor air supply port 62, and a discharge air blowing port 64. The outside air suction port 61 and the discharge air suction port 63 are provided in the side plate 24, and the indoor air supply port 62 and the discharge air blowing port 64 are provided in the side plate 25. The length direction of the side plates 24, 25 matches the length direction of the first element 41 and the second element 42. In the side plate 24, the outside air suction port 61 is at a position offset to one side (direction D3) in the length direction of the side plate 24, and the discharge air suction port 63 is at a position offset to the other side (direction D4) in the length direction of the side plate 24. In the side plate 25, the indoor air supply port 62 is at a position offset in the direction D4, and the discharge air blowing port 64 is at a position offset in the direction D3. A duct connection joint 94 is attached to the suction ports 61, 63 and blowing ports 62, 64.

Figure 5:
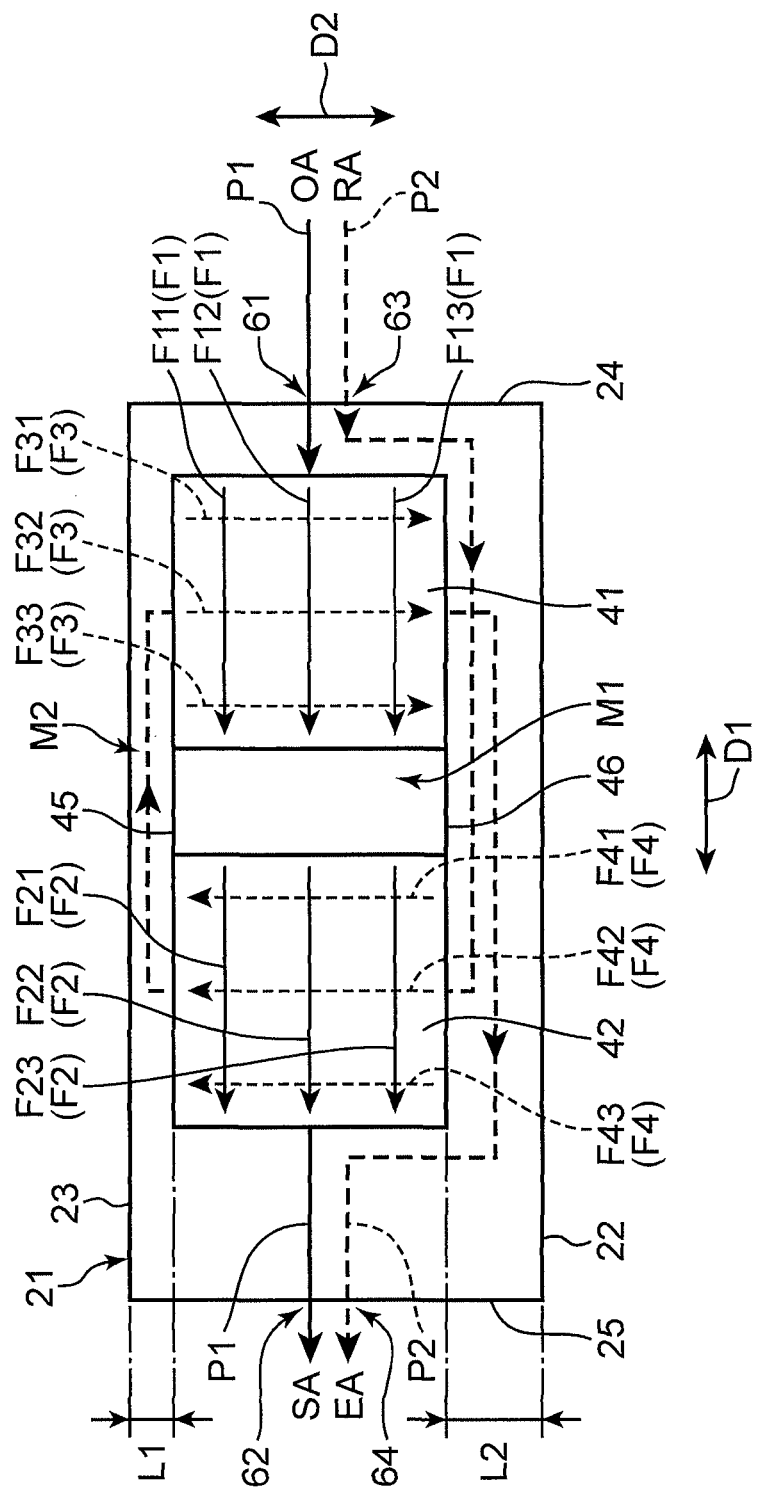
FIG. 5 is a schematic view for explaining the flow of air in the air supply path and discharge air path inside the case of the ventilation device.

The first element 41 and the second element 42 receive and release (exchange) at least either of heat and moisture between the outdoor air flowing in an air supply path P1 from the outside air suction port 61 to the indoor air supply port 62 and the indoor air flowing in a discharge air path P2 from the discharge air suction port 63 to the discharge air blowing port 64 (see FIG. 5).

Figure 4:
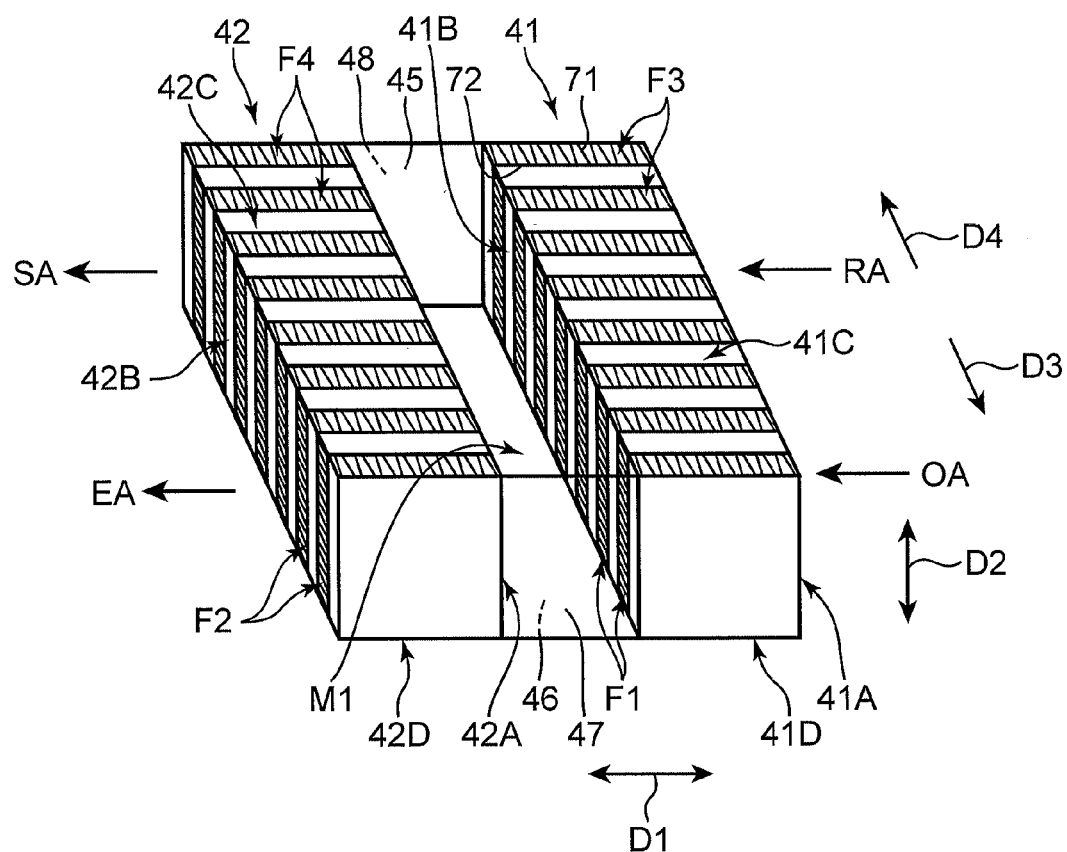
FIG. 4 is a perspective view illustrating two total heat exchange elements (first element and second element) arranged inside the case of the ventilation device.

As shown in FIG. 4, the first element 41 and the second element 42 have a rectangular parallelepiped shape. In the first element 41 and the second element 42, corrugated fins 71 and partition plates 72 are stacked alternately. The first element 41 and the second element 42 have a shape extending in the stacking direction and are disposed inside the case 21 in postures such that the length direction thereof extends in the direction substantially parallel to the directions D3, D4. The first element 41 is positioned at the side plate 24 side with respect to the second element 42. The first element 41 is disposed close to the side plate 24 and along the side plate 24.

Air flow passages are formed by the corrugated fins 71 between the partition plates 72, 72 adjacent in the stacking direction. The corrugated fins 71, 71 adjacent in the stacking direction are disposed such that the directions of the flow passages are orthogonal to each other. More specifically, the first element 41 has a transverse flow passage F1 constituted by a plurality of through holes extending in the direction D1 and a longitudinal flow passage F3 constituted by a plurality of through holes extending in the direction D2. The second element 42 has a transverse flow passage F2 constituted by a plurality of through holes extending in the direction D1 and a longitudinal flow passage F4 constituted by a plurality of through holes extending in the direction D2.

As shown in FIG. 2B and FIG. 4, in the first element 41, a surface 41A on the inlet side of the transverse flow passage F1, from among a pair of opposing surfaces 41A, 41B where the transverse flow passage F1 is open, is positioned on the side plate 24 side, and in the second element 42, a surface 42A on the inlet side of the transverse flow passage F2, from among a pair of opposing surfaces 42A, 42B where the transverse flow passage F2 is open, is positioned on the side plate 24 side. Further, in the first element 41, a surface 41C on the inlet side of the longitudinal flow passage F3, from among a pair of opposing surfaces 41C, 41D where the longitudinal flow passage F3 is open, is positioned on the top plate 23 side, and in the second element 42, a surface 42D on the inlet side of the longitudinal flow passage F4, from among a pair of opposing surfaces 42C, 42D where the longitudinal flow passage F4 is open, is positioned on the bottom plate 22 side. The opposing surfaces of the transverse flow passages F1, F2 are substantially parallel to the side plate 24. The opposing surfaces of the longitudinal flow passages F3, F4 are substantially parallel to the top plate 23 and the bottom plate 22. A filter 81 is mounted on the surface 41A of the first element 41 on the inlet side of the transverse flow passage F1, and a filter 82 is mounted on the surface 42D of the second element on the inlet side of the longitudinal flow passage F4.

The fans 92, 93 are positioned at the side plate 25 side with respect to the elements 41, 42 and disposed adjacently to the side plate 25. For example, centrifugal fans such as multi-blade fans can be used as the fans 92, 93. The fans 92, 93 each have an air suction port provided at a position facing either or both of the top plate 23 and the bottom plate 22, and an air discharge port provided at a position adjacent to the side plate 25. The discharge port of the fan 92 is connected to the discharge air blowing port 64, and the discharge port of the fan 93 is connected to the indoor air supply port 62. The fan 92 creates the air flow in the discharge air path P2, and the fan 93 creates the air flow in the air supply path P1.

As shown in FIG. 2A, the outside air suction port 61, which is the suction port of the air supply path P1, is located at a position in the side plate 24 that is offset with respect to the first element 41 in the direction D3 that is the length direction thereof. The discharge air suction port 63, which is the suction port of the discharge air path P2, is located at a position in the side plate 24 that is offset with respect to the first element 41 in the direction D4 that is the length direction thereof.

As shown in FIGS. 2A to 2C, 3, 4, and 5, a first guide plate 51, a second guide plate 52, partition members 45 to 48, and partition members 53 to 59 are provided inside the case 21. Those guide plates 51, 52, partition members 45 to 48, and partition members 53 to 59 together with the inner wall surfaces of the case 21 form the flow passage of the air supply path P1 and the flow passage of the discharge air path P2. In FIG. 5, the depiction of fans 92, 93 is omitted.

In the air suction path P1, the outdoor air OA (outside air suction OA) flows inside the case 21 through the outside air suction port 61, the transverse flow passage F1 of the first element 41, a first mixing flow passage M1, the transverse flow passage F2 of the second element 42, the fan 93, and the indoor air supply port 62 in the order of description and is then supplied as the indoor supplied air SA from the indoor air supply port 62 into the room.

In the discharge air path P2, the indoor air (discharge air suction RA) flows inside the case 21 through the discharge air suction port 63, the longitudinal flow passage F4 of the second element 42, a second mixing flow passage M2, the longitudinal flow passage F3 of the first element 41, the fan 92, and the discharge air blowing port 64 in the order of description and is then discharged as discharge air EA from the discharge air blowing port 64 to the outside. More specifically, the discharge air path P2 has a circular route in which the air sucked into the case 21 in a first direction from the discharge air suction port 63 flows to the side plate 25 side with respect to the first element 41 through the below-described bypass circuit B (see FIG. 3), which does not pass through the first element 41, first passes through the second element 42, then flows in the second mixing flow passage M2 in the direction opposite to the first direction through which the indoor air was sucked through the disvharge air suction port 63 to the side plate 24 side, and then passes through the first element 41 and reaches the discharge air blowing port 64 (see FIGS. 2B and 5).

As shown in FIGS. 4 and 5, the first mixing flow passage M1 is provided between the transverse flow passage F1 of the first element 41 and the transverse flow passage F2 of the second element 42 and connects the transverse flow passage F1 to the transverse flow passage F2. The first mixing flow passage M1 is formed by disposing the first element 41 and the second element 42 so that a gap is formed therebetween in the direction D1. Since the first element 41 and the second element 42 are disposed in postures such that the length directions thereof are parallel to each other, the first mixing flow passage M1 has a constant width along the substantially entire spread in the length direction thereof. In other words, the distance between the surface 41B of the first element 41 and the surface 42A of the second element 42 is substantially constant along the substantially entire spread in the length direction thereof. The first mixing flow passage M1 is the space in the form of a rectangular parallelepiped.

The first mixing flow passage M1 can be formed by providing, for example, the partition members 45, 46, 47, 48 between the first element 41 and the second element 42. The partition member 45 closes the upper gap between the first element 41 and the second element 42 (upper portion in FIGS. 4 and 5). The partition member 46 closes the downside gap between the first element 41 and the second element 42. The partition member 47 closes the gap in the direction D3 between the first element 41 and the second element 42. The partition member 48 closes the gap in the direction D4 between the first element 41 and the second element 42.

Figure 2:
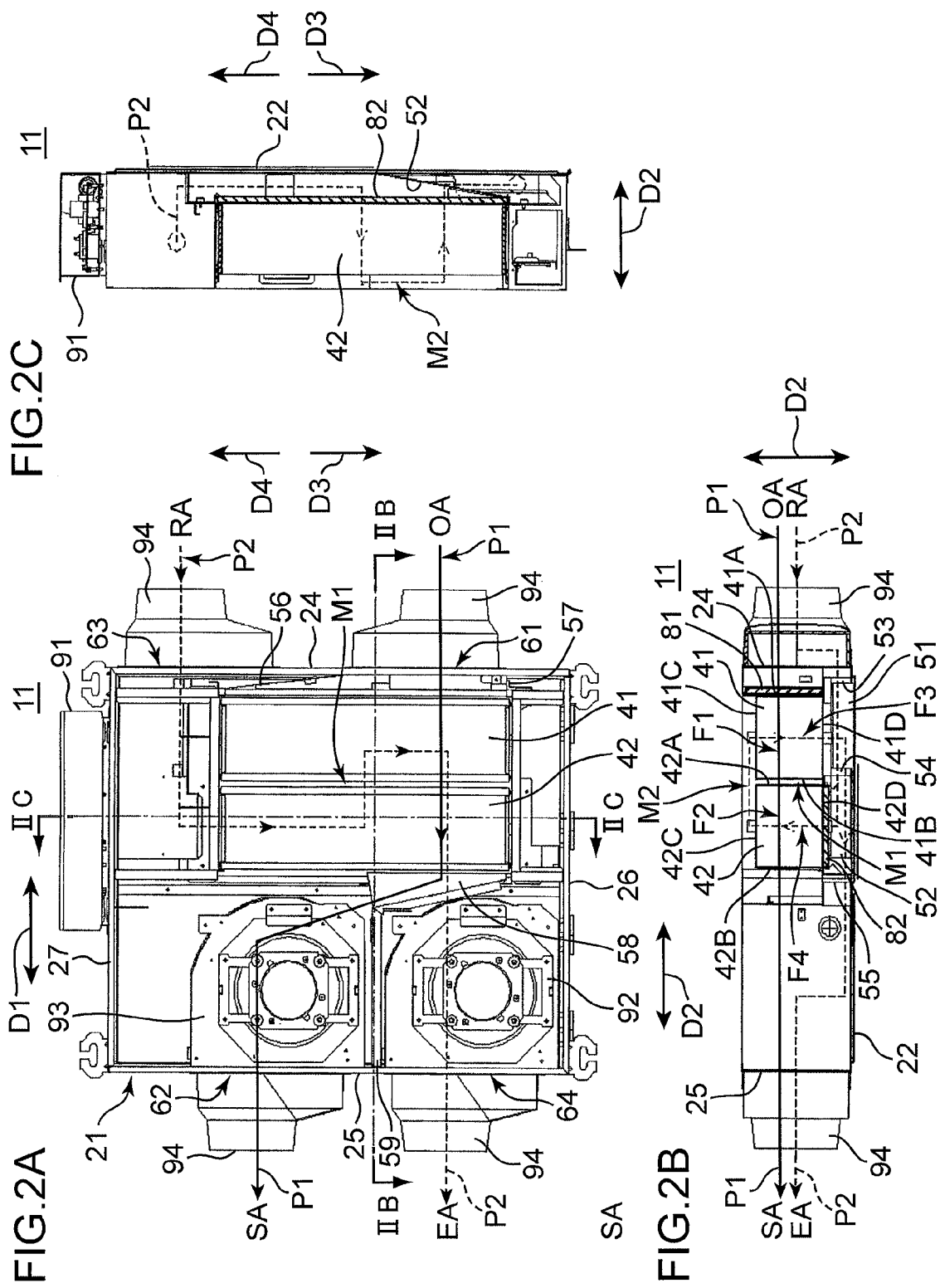
FIG. 2A is a plan view illustrating the state in which the top plate of the case of the ventilation device is removed.
FIG. 2B is a sectional view taken along the IIB-IIB line in FIG. 2A.
FIG. 2C is a sectional view taken along the IIC-IIC line in FIG. 2A.

As shown in FIGS. 2 and 5, the second mixing flow passage M2 is provided between the top plate 23, and the first element 41 and the second element 42. The second mixing flow passage M2 is a space between the inner surface of the top plate 23 and the surface 41C of the first element 41, the surface 42C of the second element 42, and the partition member 45. The second mixing flow passage M2 is positioned between the longitudinal flow passage F3 of the first element 41 and the longitudinal flow passage F4 of the second element 42 and connects the longitudinal flow passage F3 to the longitudinal flow passage F4.

The first element 41 and the second element 42 are arranged at positions closer to the top plate 23 than to the bottom plate 22 in the direction D2. Thus, the distance L1 between the first element 41 and the second element 42, and the top plate 23 is less than the distance L2 between the first element 41 and the second element 42, and the bottom plate 22. The second mixing flow passage M2 is thus provided where the distance between the main plate and the elements is smaller.

The flow of air in the present embodiment will be explained below with reference to FIG. 5. In FIG. 5, the structure is simplified to facilitate the explanation. As shown in FIG. 5, the transverse flow passage F1 of the first element 41 has three through holes F11, F12, F13, and the transverse flow passage F2 of the second element 42 has three through holes F21, F22, F23. The longitudinal flow passage F3 of the first element 41 has three through holes F31, F32, F33, and the longitudinal flow passage F4 of the second element 42 has three through holes F41, F42, F43.

The air flows that have passed through the through holes F11, F12, F13 in the transverse flow passage F1 of the first element 41 are mixed in the first mixing flow passage M1 before flowing into the transverse flow passage F2 of the second element 42, and then flow into the through holes F21, F22, F23 of the transverse flow passage F2 of the second element 42. The air flows that have passed through the through holes F41, F42, F43 in the longitudinal flow passage F4 of the second element 42 are mixed in the second mixing flow passage M2 before flowing into the longitudinal flow passage F3 of the first element 41, and then flow into the through holes F31, F32, F33 of the longitudinal flow passage F3 of the first element 41.

As shown in FIG. 2A, the partition member 56 is provided between the side plate 24 and the surface 41A of the first element 41 on the inlet side of the transverse flow passage F1, so that the outside air suction OA sucked in from the outside air suction port 61 in the air supply path P1 is not mixed with the discharge air suction RA sucked in from the discharge air suction port 63 in the discharge air path P2. One end of the partition member 56 is fixed in the vicinity of the end portion of the first element 41 in the direction D4, and the other end of the partition member 56 is close to or abuts against the side plate 24. Further, the partition member 57 is provided between the side plate 24 and the end portion of the first element 41 in the direction D3. The partition member 56 and the partition member 57 constitute an integrated plate-shaped member, and an opening that allows the outside air suction OA to pass therethrough is provided in the region of the outside air suction port 61.

The partition member 58 and the partition member 59 serve to guide the air (outside air suction OA) that has passed through the transverse flow passage F2 of the second element 42 in the air supply path P1 to the fan 93 and to partition the air supply path P1 and the discharge air path P2 so that this air is not mixed with the air flowing in the discharge air path P2. The partition member 58 covers the region of the surface 42B of the second element 42 on the outlet side of the transverse flow passage F2, this region being on the direction D3 side. The partition member 59 is a plate-shaped member provided upright between the fan 92 and the fan 93. One end of the partition member 59 is connected to the end portion of the partition member 58 in the direction D4, and the other end of the partition member 59 is connected to the side plate 25.

Figure 3:
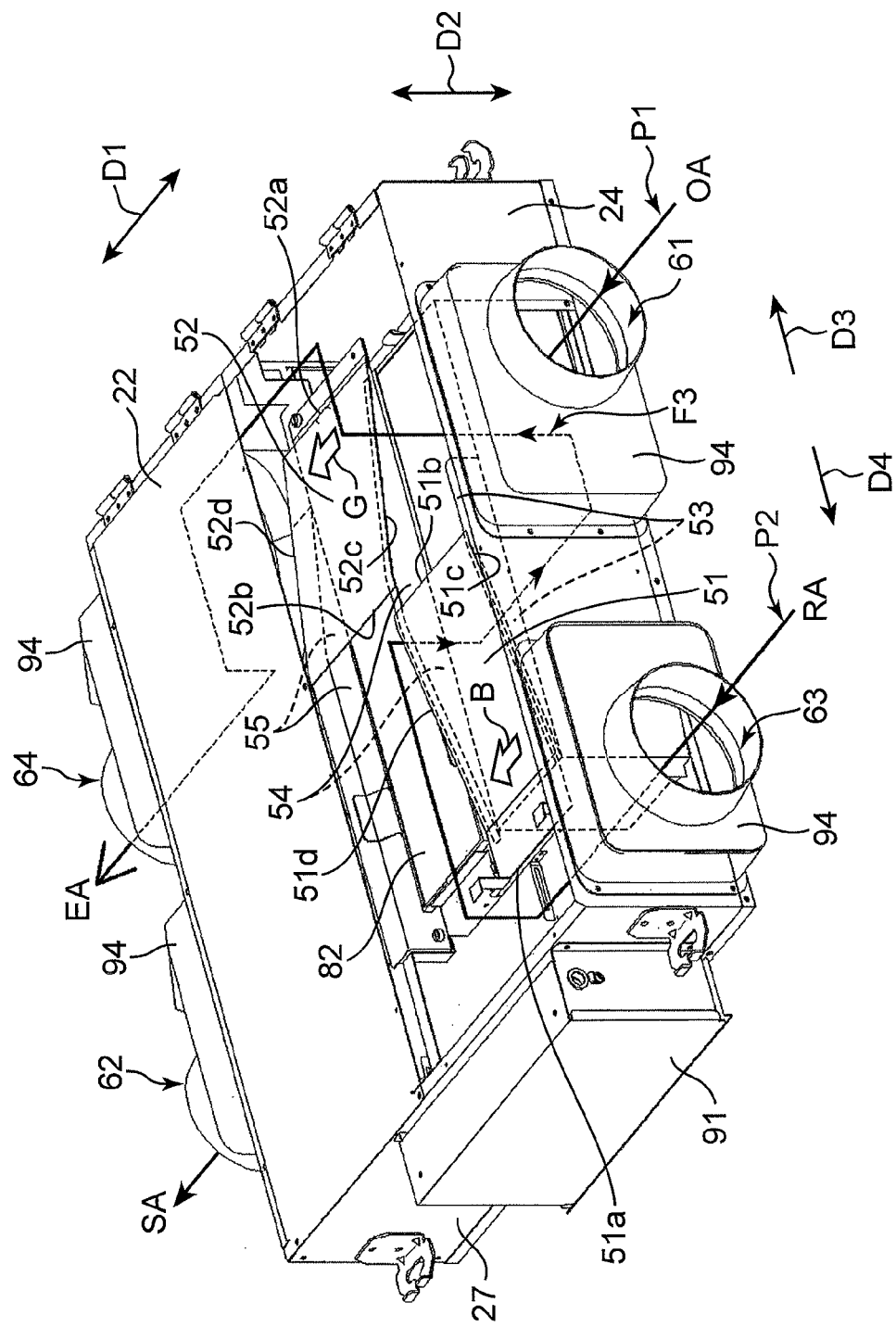
FIG. 3 is a perspective view of the ventilation device taken from the bottom surface side, illustrating the state in which part of the bottom plate of the case is removed.

As shown in FIGS. 2B, 2C, and 3, the first guide plate 51 is disposed between the bottom plate 22 and the first element 41. The inner surface of the first guide plate 51 faces the surface 41D of the first element 41 on the outlet side of the longitudinal flow passage F3, and the outer surface of the first guide plate 51 faces the bottom plate 22. The second guide plate 52 is disposed between the bottom plate 22 and the second element 42. The inner surface of the second guide plate 52 faces the surface 42D of the second element 42 on the inlet side of the longitudinal flow passage F4, and the outer surface of the second guide plate 52 faces the bottom plate 22.

One end side 51a of the first guide plate 51 is positioned at the end portion of the first element 41 in the direction D4. The other end side 51b of the first guide plate 51 is positioned on the direction D3 side with respect to the one end side 51a. The first guide plate 51 extends from the one end side 51a to the vicinity of the center of the first element 41 in the length direction. The first guide plate 51 is disposed in a posture inclined with respect to the length direction of the first element 41, so that the distance between the first guide plate 51 and the surface 41D of the first element 41 on the outlet side of the longitudinal flow passage F3 increases with the transition from the one end side 51a to the other end side 51b.

One end side 52a of the second guide plate 52 is positioned at the end portion of the second element 42 in the direction D3. The other end side 52b of the second guide plate 52 is positioned on the direction D4 side with respect to the one end side 52a. The second guide plate 52 extends from the one end side 52a to the vicinity of the center of the second element 42 in the length direction. The second guide plate 52 is disposed in a posture inclined with respect to the length direction of the second element 42, so that the distance between the second guide plate 52 and the surface 42D of the second element 42 on the inlet side of the longitudinal flow passage F4 increases with the transition from the other end side 52b to the one end side 52a.

In the present embodiment, the one end side 51a of the first guide plate 51 is fixed to the end portion of the first element 41 in the direction D4, and the one end side 52a of the second guide plate 52 is fixed to the end portion of the second element 42 in the direction D3, but such a configuration is not limiting. For example, the first guide plate 51 and the second guide plate 52 may be fixed to the inner surface of the bottom plate 22.

The first guide plate 51 is a plate-shaped member having a substantially rectangular shape in the plan view thereof. This member has the one end side 51a and the other end side 51b and also one lateral side 51c and the other lateral side 51d extending between the end sides. The one lateral side 51c is positioned at the suction port side (side plate 24 side), and the other lateral side 51d is positioned at the blowing port side (side plate 25 side). The second guide plate 52 is a plate-shaped member having the one end side 52a and the other end side 52b and also one lateral side 52c and the other lateral side 52d extending between the end sides. The one lateral side 52c is positioned at the suction port side (side plate 24 side), and the other lateral side 52d is positioned at the blowing port side (side plate 25 side). The other end side 51b of the first guide plate 51 and the other end side 52b of the second guide plate 52 are at positions close to each other in the side view from the direction D1.

The gap between the one lateral side 51c and the first element 41 that is created as a result of disposing the first guide plate 51 in the above-described inclined posture is closed by the partition member 53, and the gap between the other lateral side 51d and the first element 41 is closed by the partition member 54.

The partition member 53 is a plate-shaped member that is provided upright from the vicinity of the edge portion (ridge extending in the length direction) on the bottom plate 22 side and side plate 24 side in the first element 41 toward the lateral side 51c and located close to or abutted against the inner surface of the first guide plate 51. The partition member 53 extends in the direction D3 from the vicinity of the end portion of the first element 41 in the direction D4 till it passes the other end side 51b of the first guide plate 51 (passes the center of the first element 41 in the length direction). The partition member 53 has an edge inclined along the inclination direction of the first guide plate 51, and this edge is located close to or abutted against the inner surface of the first guide plate 51.

The partition member 54 is a plate-shaped member extending from the vicinity of the end portion of the first element 41 in the direction D4 to the vicinity of the end portion in the direction D3. The region taking about a half of the partition member 54 in the direction D4 serves to close the gap between the lateral side 51d of the first guide plate 51 and the first element 41, and the region taking about a half in the direction D3 serves to close the gap between the lateral side 52c of the second guide plate 52 and the second element 42.

The partition member 54 is provided upright from the vicinity of the edge portion (ridge extending in the length direction) on the bottom plate 22 side and the second element 42 side in the first element 41 toward the lateral side 51d of the first guide plate 51 and the lateral side 52c of the second guide plate 52. The partition member 54 has an edge inclined along the inclination direction of the first guide plate 51, and this edge is located close to or abutted against the inner surface of the first guide plate 51. The partition member 54 also has an edge inclined along the inclination direction of the second guide plate 52, and this edge is located close to or abutted against the inner surface of the second guide plate 52. Since the partition member 54 thus follows the inclination of the first guide plate 51 and the inclination of the second guide plate 52, it has a shape close to that of a protruding triangle or trapezoid at the bottom plate 22 side in a side view thereof from the suction port side in the direction D1.

The gap between the lateral side 52d of the second guide plate 52 and the second element 42 is closed by the partition member 55. The partition member 55 is a plate-shaped member that is provided upright from the vicinity of the edge portion (ridge extending in the length direction) on the bottom plate 22 side and the side plate 25 side in the second element 42 toward the lateral side 52d and is located close to or abutted against the inner surface of the second guide plate 52.

The partition member 55 has an inclined edge portion extending from the vicinity of the end portion of the second element 42 in the direction D3 till it passes the other end side 52b of the second guide plate 52 (passes the center of the second element 42 in the length direction) and a parallel edge portion further extending from the inclined edge portion to the vicinity of the end portion of the second element 42 in the direction D4. The inclined edge portion is inclined along the inclination direction of the second guide plate 52 and is located close to or abutted against the inner surface of the second guide plate 52. The parallel edge portion is substantially parallel to the bottom plate 22 and constitutes, together with the bottom plate 22, part of the route of the discharge air path P2.

As shown in FIG. 3, the first guide plate 51 forms part of the bypass circuit B that prevents the air flowing in the discharge air path P2 from flowing into the longitudinal flow passage F3 of the first element 41 and guides this air to the longitudinal flow passage F4 of the second element 42. The bypass circuit B includes a region between the outer surface (surface on the bottom plate 22 side) of the first guide plate 51 and the inner surface of the bottom plate 22, and a region between the end surface of the first element 41 in the direction D4 and the inner surface of the side plate 27. The cross-sectional area (area of the cross section perpendicular to the air flow direction) of the bypass circuit B can be adjusted by adjusting the inclination angle of the first guide plate 51.

The first guide plate 51 serves to distribute a large portion of the air in the discharge air path P2 that flows in the longitudinal flow passage F3 of the first element 41 to the region in the direction D3 which is the length direction of the first element 41. Thus, since the region in the direction D4 of the first element 41 is at a small distance from the first guide plate 51, the resistance to the flow of the air flowing out from the longitudinal flow passage F3 increases. Therefore, the air in the discharge air path P2 that flows in the longitudinal flow passage F3 of the first element 41 is distributed in a larger amount in the region in the direction D3 than the region in the direction D4 which is the length direction of the first element 41. The distribution of air can be adjusted by adjusting the inclination angle of the first guide plate 51.

The second guide plate 52 forms the guide path G that prevents the air that has passed through the longitudinal flow passage F3 of the first element 41 and flows in the discharge air path P2 from reflowing into the longitudinal flow passage F4 of the second element 42 and guides the air to the indoor air supply port 62 side. The cross-sectional area (area of the cross section perpendicular to the air flow direction) of the guide path G can be adjusted by adjusting the inclination angle of the second guide plate 52.

INSTALLATION EXAMPLE 1

Figure 6:
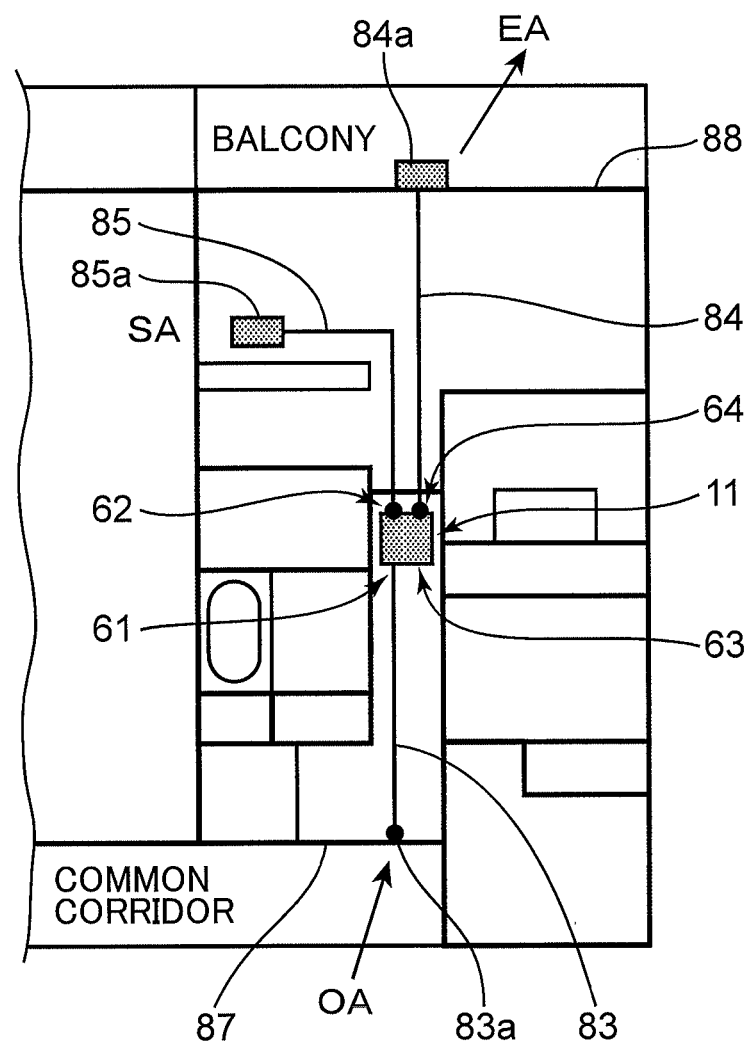
FIG. 6 is a schematic view illustrating the installation example 1 of the ventilation device.

FIG. 6 is a schematic diagram illustrating the installation example 1 of the ventilation device 11. FIG. 6 shows a floor plan of a housing complex, such as a condominium, and the ventilation device 11 shown in the figure is installed in the space above the ceiling. The outside air suction port 61, discharge air suction port 63, indoor air supply port 62, and discharge air blowing port 64 of the ventilation device 11 are disposed as shown in FIG. 2. The ventilation device 11 is positioned substantially in the center between a one wall surface 87 on the lower side of a shared corridor and another wall surface 88 on the balcony side. More specifically, the side plate 24 (FIG. 2) of the case 21 faces the one wall surface 87 side, and the side plate 25 faces the other wall surface 88 side.

A duct 83 connected to the outside air suction port 61 extends as far as the one wall surface 87 of the building. A suction port 83a connected to the duct 83 is provided in the one wall surface 87. A duct 84 connected to the discharge air blowing port 64 extends as far as the other wall surface 88 positioned on the opposite side of the one wall surface 87. A blowing port 84a connected to the duct 84 is provided in the other wall surface 88. A duct 85 connected to the indoor air supply port 62 extends as far as a room adjacent to the balcony. A blowing port 85a connected to the duct 85 is provided in the ceiling of this room.

In the present embodiment, the outside air suction port 61 is provided in the side plate 24, and the discharge air blowing port 64 is provided in the side plate 25 facing the side plate 24. Therefore, the duct 83 and the duct 84 can be arranged substantially linearly, without creating U-turn configurations of the duct 83 or the duct 84.

INSTALLATION EXAMPLE 2

Figure 7:
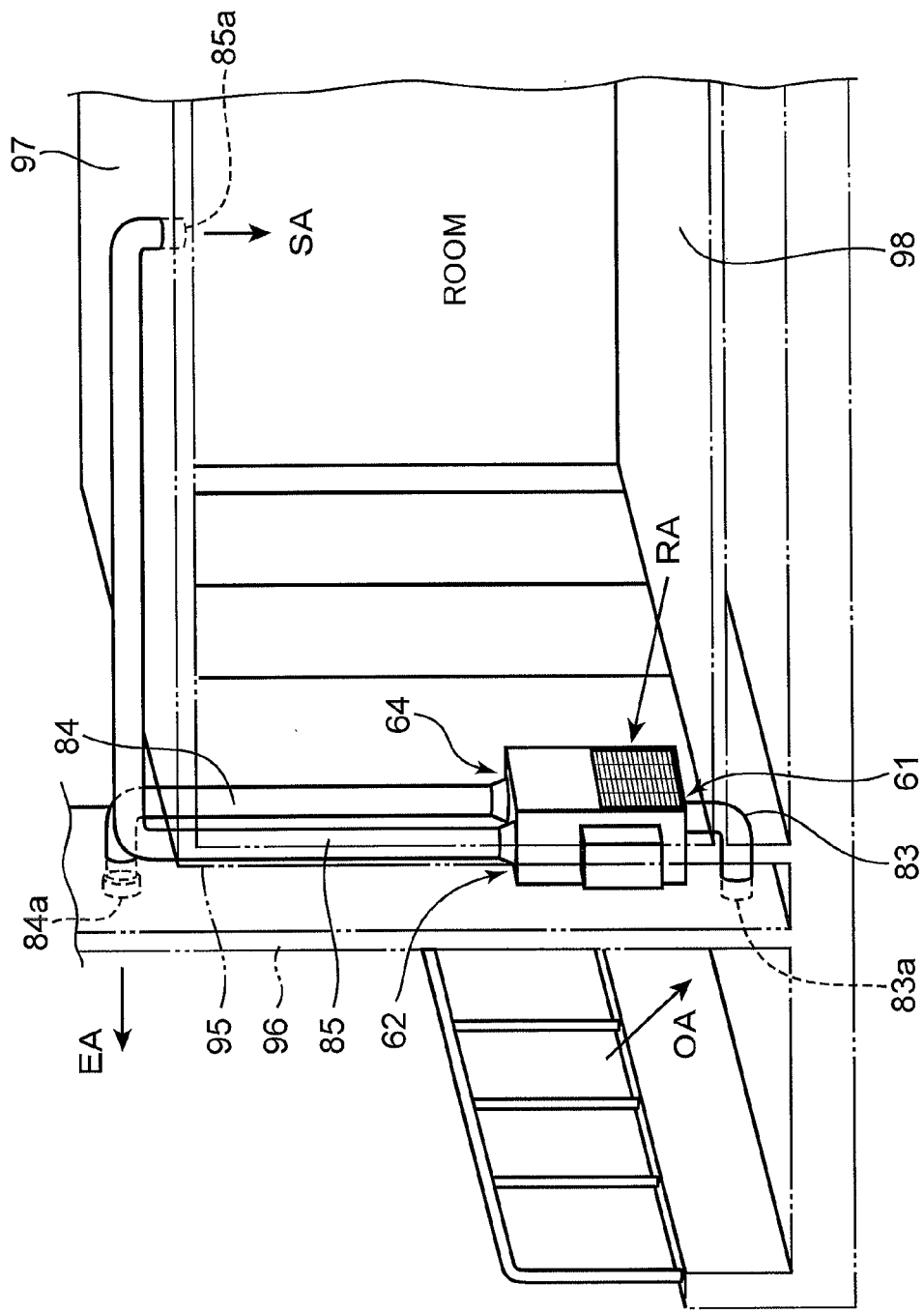
FIG. 7 is a perspective view illustrating the installation example 2 of the ventilation device.

FIG. 7 is a perspective view illustrating the installation example 2 of the ventilation device 11. In the installation example 2, the side plate 24 provided with the outside air suction port 61 of the ventilation device 11 faces downward, and the side plate 25 where the indoor air supply port 62 and the discharge air blowing port 64 are provided faces upward. The discharge air suction port 61 is provided in the main plate 22 (bottom plate 22 in FIG. 2). The position at the main plate 22 where the discharge air suction port 61 is provided is close to the side plate 24, more specifically this position is within a region facing the first element 41 and/or the second element 42. In the ventilation device 11, the discharge air suction port 63 of the side plate 24 shown in FIG. 2 is closed. The ventilation device 11 is disposed in a space provided between an outer wall 96 and an inner wall 95 of a room at a height close to a floor surface 98 of the room.

The duct 83 connected to the outside air suction port 61 extends downward, then bends toward the outer wall 96 side, and extends to reach the outer wall 96. A suction port 83a connected to the duct 83 is provided in the outer wall 96. The duct 85 connected to the indoor air supply port 62 extends upward till it passes a ceiling 97 in the space between the inner wall 95 and the outer wall 96 and then extends along the ceiling 97 through the space above the ceiling. A blowing port 85a connected to the duct 85 is provided in the ceiling 97. The duct 84 connected to the discharge air blowing port 64 extends upward to pass the ceiling 97 in the space between the inner wall 95 and the outer wall 96, bends toward the outer wall 96 side, and extends to reach the outer wall 96. A blowing port 84a connected to the duct 84 is provided in the outer wall 96.

In the present embodiment the outside air suction port 61 is provided in the side plate 24 facing downward, and the discharge air blowing port 64 is provided in the side plate 25 facing upward. Therefore, the duct 83 and the duct 84 can be arranged substantially linearly, without creating U-turn configurations of the duct 83 or the duct 84.

VARIATION EXAMPLE

Figure 8A:
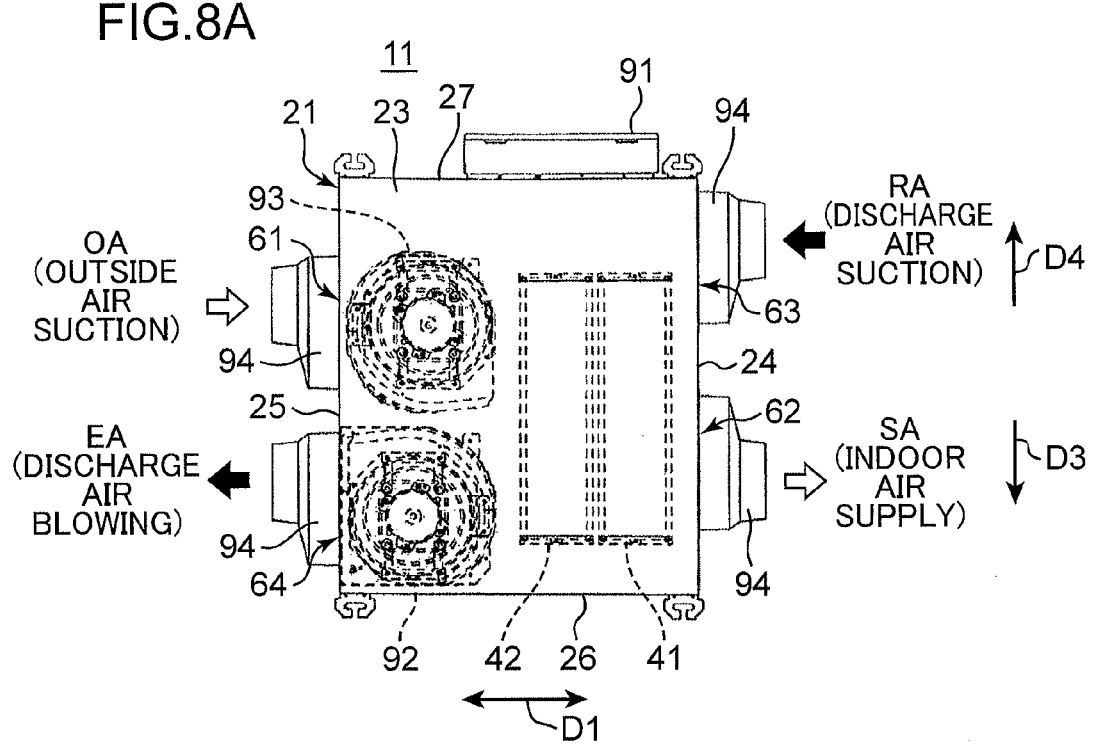
FIG. 8A is a plan view illustrating a variation example of the ventilation device.
Figure 8B:
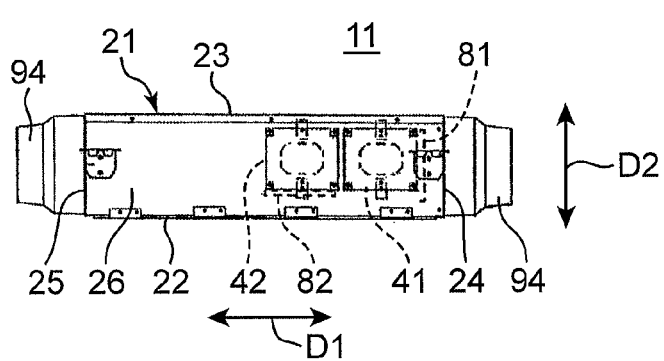
FIG. 8B is a front view thereof.

In the above-described embodiment, the configuration in which the outside air suction port 61 and the discharge air suction port 63 are provided in the side plate 24, and the indoor air supply port 62 and the discharge air blowing port 64 are provided in the side plate 25 is described by way of example, but such a configuration is not limiting. For example, as shown in FIGS. 8A and 8B, the indoor air supply port 62 and the discharge air suction port 63 may be provided in one side plate (for example, side plate 24), and the outside air suction port 61 and the discharge air blowing port 64 may be provided in the other side plate (for example, side plate 25) facing the one side plate.

Figure 9:
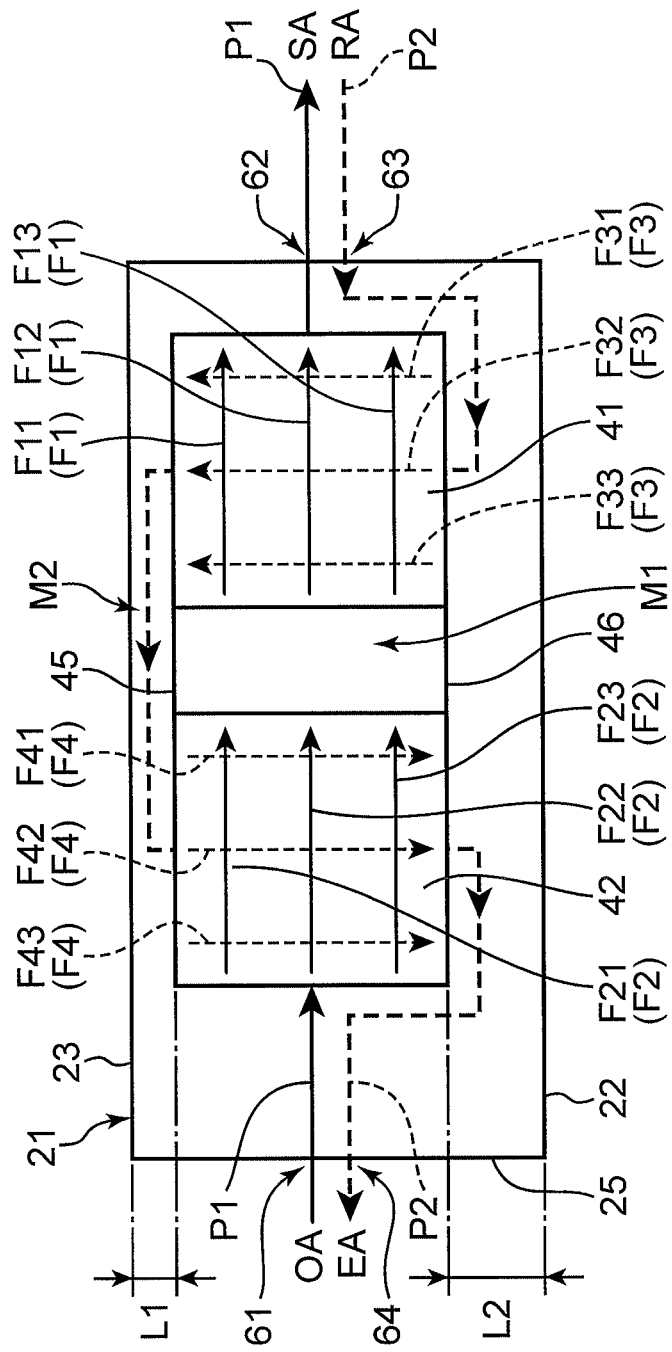
FIG. 9 is a schematic view for explaining the flow of air in the air supply path and discharge air path inside the case of the ventilation device of the variation example.

In this variation example, the discharge air path P2 has a route such as shown in FIG. 9 and does not have the above-described circular route. Thus, in the discharge air path P2, the indoor air (discharge air suction RA) flows inside the case 21 through the discharge air suction port 63, longitudinal flow passage F3 of the first element 41, second mixing flow passage M2, longitudinal flow passage F4 of the second element 42, fan 92, and discharge air blowing port 64 in the order of description and is discharged as the discharge air blow EA to the outside from the discharge air blowing port 64. The depiction of fans 92, 93 is omitted in FIG. 9.

In the air supply path P1, the outdoor air OA (outside air suction OA) flows inside the case 21 through the outside air suction port 61, fan 93, transverse flow passage F2 of the second element 42, first mixing flow passage M1, transverse flow passage F1 of the first element 41, and the indoor air supply port 62 in the order of description and is then supplied as the indoor supplied air SA from the indoor air supply port 62 into the room.

The above-described specific embodiments mainly include the invention having the following features.

(1) The ventilation device of the present embodiment includes a case (21) and a first element (41) and a second element (42) in the form of a rectangular parallelepiped. The case (21) includes a pair of main plates (22, 23) disposed opposite each other and a pair of side plates (24, 25) disposed opposite each other and connecting end portions of the pair of main plates (22, 23). The first element (41) and the second element (42) are arranged adjacent to each other in a facing direction (D1) of the side plates, in which the pair of side plates (24, 25) face each other, and induce total heat exchange between outdoor air and indoor air. The first element (41) and the second element (42) are of a crossflow type provided with transverse flow passages (F1, F2) constituted by a plurality of through holes extending in the facing direction (D1) of the side plates and longitudinal flow passages (F3, F4) constituted by a plurality of through holes extending in a facing direction (D2) of the main plates, in which the main plates (22, 23) face each other.

The first element (41) and the second element (42) are disposed in postures such that the length directions thereof are parallel to each other. The first element (41) is disposed in a posture such that a pair of opposing surfaces (41C, 41D) where the longitudinal flow passage (F3) is open is parallel to the one main plate (22), and the second element (42) is disposed in a posture such that a pair of opposing surfaces (42C, 42D) where the longitudinal flow passage (F4) is open is parallel to the one main plate (22).

A mixing flow passage (M1) formed as a result of the first element (41) and the second element (42) being disposed with a gap therebetween in the facing direction (D1) of the side plates is provided between the transverse flow passage (F1) of the first element (41) and the transverse flow passage (F2) of the second element (42).

In such a configuration, the first element (41) is disposed in a posture such that the pair of opposing surfaces (41C, 41D) where the longitudinal flow passage (F3) is open is parallel to the one main plate (22), and the second element (42) is disposed in a posture such that the pair of opposing surfaces (42C, 42D) where the longitudinal flow passage (F4) is open is parallel to the one main plate (22). Therefore, even if the size of the total heat exchange elements is the same, the size of the case in the thickness direction can be reduced by comparison with the configuration in which the total heat exchange elements in the form of rectangular parallelepipeds are disposed in postures such that the direction connecting the opposing corners is parallel to one main plate, as in Patent Document 1.

However, since the first element (41) and the second element (42) are total heat exchange elements of a crossflow type in which the transverse flow passages (F1, F2) constituted by a plurality of through holes are perpendicular to the longitudinal flow passages (F3, F4) constituted by a plurality of through holes, the degree of heat exchange in the plurality of through holes is not constant and greatly varies among the through holes.

For example, in the first element (41) shown in FIG. 5, the difference in temperature with the air flowing in the longitudinal flow passage (F3) is larger in the through hole (F11) of the transverse flow passage (F1), which is close to the inlet side of the longitudinal flow passage (F3), than in the through hole (F13) of the transverse flow passage (F1) that is close to the outlet side of the longitudinal flow passage (F3), and therefore the exchange of heat between the air flows is facilitated. Therefore, assuming the configuration in which the mixing flow passages are absent and the first element (41) and the second element (42) are arranged adjacent to each other without a gap therebetween, where the air passing through the through hole (F11) of the transverse flow passage (F 1), which is close to the inlet side of the longitudinal flow passage (F3) in the first element (41), undergoes sufficient heat exchange in the first element (41), when this air thereafter passes through the through hole (F21) of the transverse flow passage (F2) of the second element (41), the difference in temperature between this air and the air flowing in the longitudinal flow passage (F4) can be extremely small. In such a configuration, practically no heat exchange takes place between the air flowing in the through hole (F21) of the transverse flow passage (F2) and the air flowing in the longitudinal flow passage (F4), and the through hole (F21) of the transverse flow passage (F2) becomes useless.

Accordingly, in the present configuration, the mixing flow passage (M1) formed as a result of the first element (41) and the second element (42) being disposed with a gap therebetween in the facing direction (D1) of the side plates is provided between the transverse flow passage (F1) of the first element (41) and the transverse flow passage (F2) of the second element (42). Since such a mixing flow passage (M1) is provided, for example, the air flows passing through the plurality of through holes in the transverse flow passage (F1) of the first element (41) are mixed in the mixing flow passage (M1) before flowing into the transverse flow passage (F2) of the second element (42).

In such a configuration, where the mixing flow passage is simply provided between the first element (41) and the second element (42), for example, in the location with an extremely narrow gap between the first element (41) and the second element (42), the air flowing out of the through holes present in the transverse flow passage (F 1) of the first element (41) immediately reaches the through holes of the transverse flow passage (F2) of the second element (42) located in the vicinity of the through holes of the transverse flow passage of the first element. The resultant problem is that the air flows flowing in the former through holes flow to the through holes located in the vicinity thereof, while maintaining the variability in the difference in temperature, before being sufficiently mixed with the air flowing from the other through holes in the mixing flow passage.

Accordingly, in the present configuration, the first element (41) and the second element (42) are disposed in postures such that the length directions thereof are parallel to each other. Thus, the gap constituting the mixing flow passage (M1) is substantially constant in the length direction. As a result, the above-described problem can be resolved, and therefore the air flows flowing out of the plurality of through holes of the transverse flow passage (F1) can be uniformly mixed in the mixing flow passage (M1). As a consequence, the occurrence of useless through holes, such as mentioned hereinabove, can be prevented and therefore, the decrease in performance of the ventilation device can be prevented. As follows from above, it is possible to reduce the size of the case in the thickness direction, while maintaining the performance of the ventilation device.

(2) In the ventilation device, it is preferred that the first element (41) and the second element (42) be arranged at positions closer to the other main plate (23) than to the one main plate (22) in the facing direction (D2) of the main plates, a second mixing flow passage (M2) be provided between the longitudinal flow passage (F3) of the first element (41) and the longitudinal flow passage (F4) of the second element (42), and the second mixing flow passage (M2) be a space between the other main plate (23) on one side and the first element (41) and the second element (42) on the other side.

As mentioned hereinabove, the first element (41) and the second element (42) are total heat exchange elements of a crossflow type. Therefore, the degree of heat exchange in the plurality of through holes is not constant and greatly varies among the through holes.

Accordingly, in the present configuration, the second mixing flow passage (M2) is provided between the longitudinal flow passage (F3) of the first element (41) and the longitudinal flow passage (F4) of the second element (42). As a result, the air flows passing through a plurality of through holes in the longitudinal flow passage (longitudinal flow passage F4 of the second element 42 in the configuration shown in FIG. 5) in the element positioned on the upstream side are mixed in the second mixing flow passage (M2) before flowing into the longitudinal flow passage (longitudinal flow passage F3 of the first element 41 in the configuration shown in FIG. 5) of the element positioned on the downstream side. Further, this second mixing flow passage (M2) is positioned in the space between the other main plate (23) on one side and the first element (41) and the second element (42) on the other side. Thus, the second mixing flow passage M2 is positioned in the space with the smaller gap between the main plate and the elements. Since the space with the smaller gap is thus used as the second mixing flow passage (M2), when the air flows flow out of the plurality of through holes of the longitudinal flow passage in the element on the upstream side and pass through the second mixing flow passage (M2), the air flows are mixed easier than when the air flows pass through the space with a larger gap. As a result, the occurrence of useless through holes, such as described hereinabove, in the longitudinal flow passage of the element on the downstream side can be prevented and the degradation of performance of the ventilation device can be prevented more effectively.

The present invention is not limited to the above-described embodiments and can be changed and modified without departing from the technical scope thereof.

For example, in the embodiment, the configuration in which the outside air suction port, discharge air suction port, indoor air supply port, and discharge air blowing port are provided in the side plate of the case is described by way of example, but such a configuration is not limiting and the aforementioned components may be also provided in the main plate. In such a configuration, they are provided in a portion of the entire region of the main plate that is positioned close to the side plate.

Further, in the embodiment, the configuration in which the first guide plate and the second guide plate are disposed between the base plate on one side and the first element and the second element on the other side is described by way of example, but the first guide plate and the second guide plate can be omitted. Further, the first guide plate and the second guide plate may be disposed between the top plate on one side and the first element and the second element on the other side.

In the embodiment, the configuration in which the discharge gas path P2 has a circular route is described by way of example, but the air supply path P1 may also have a circular route.

Further, in the embodiment, as shown in FIGS. 2B and 5, one path P1 has a route (for example, a route leading from OA to SA) leading linearly, in a side view thereof, inside the case 21, and the other path P2 has a circular route inside the case 21. Therefore, the air layer (second mixing flow passage M2) of the other path P2 is formed above the one path P1, and the air layer of the other path P2 is formed below the one path P1. Thus, the air flowing in the one path P1 is sandwiched between the upper and lower air layers and is unlikely to be affected by the temperature outside the casing.

REFERENCE EXAMPLE

In the conventional ventilation device such as described in Patent Document 1 (Japanese Patent Application Publication No. 2007-285584), the outside air suction port is provided in one side plate and the discharge air suction port is provided in the other side plate, from among the pair of side plates that is disposed opposite each other and constitutes the case. Further, the discharge air blowing port for blowing the indoor air sucked in from the discharge air suction port is provided in the same one side plate in which the outside air suction port is provided.

However, where the outside air suction port and discharge air blowing port are provided in the same side plate, as in the ventilation device of Patent Document 1, a short circuit can occur in which part of the indoor air blown out form the discharge air blowing port is again sucked in from the outside air suction port. Therefore, the arrangement positions of the duct connected to the outside air suction port and the duct connected to the discharge air blowing port should be carefully designed to avoid the occurrence of such short circuit. In particular, where the ventilation device is reduced in size, the distance between the outside air suction port and the discharge air blowing port decreases and therefore the short circuit is more likely to occur.

In order to prevent the short circuit, it is necessary, for example, to bend significantly the duct connected to the outside air suction port and/or the duct connected to the discharge air blowing port and install the ducts at an increased distance from each other. With such a configuration, an installation space is necessary to arrange the bent ducts. Therefore, such an approach is unsuitable when stringent restrictions are placed on the installation space, for example, when the ventilation device is installed in the space above the ceiling.

The object of the below-described reference example is to provide a ventilation device which excels in ventilation performance and in which the ducts can be easily arranged so as to prevent the short circuit.

(1) The ventilation device of the reference example includes a case (21) and a first element (41) and a second element (42). The case (21) includes a pair of main plates (22, 23) disposed opposite each other and a pair of side plates (24, 25) disposed opposite each other and connecting end portions of the pair of main plates (22, 23), and has an outside air suction port (61), an indoor air supply port (62), a discharge air suction port (63), and a discharge air blowing port (64). The first element (41) and the second element (42) induce total heat exchange between the outdoor air and indoor air. The outside air suction port (61) is provided in one side plate (24) or in the vicinity thereof. The discharge air blowing port (64) is provided in the other side plate (25) or in the vicinity thereof. The first element (41) is positioned at the one side plate (24) side with respect to the second element (42).

From among the air supply path (P1) leading from the outside air suction port (61) to the indoor air supply port (62) and the discharge air path (P2) leading from the discharge air suction port (63) to the discharge air blowing port (64), one path has a route by which the air sucked into the case (21), from either of the outside air suction port (61) and the discharge air suction port (63), passes through the first element (41) and then passes through the second element (42). The other path has a circular route by which the air sucked into the case (21) from the other suction port, from among the outside air suction port (61) and the discharge air suction port (63), first flows to the other side plate (25) side with respect to the first element (41) via a bypass circuit (B), which does not pass through the first element (41), passes through the second element (42), and then returns to the one side plate (24) side and passes through the first element (41).

In the ventilation device of such configuration, the ducts can be easily arranged so as to prevent a short circuit and excellent ventilation performance is ensured. Those results are explained below in greater detail.

In the above-described configuration, in order to facilitate the arrangement of the ducts that prevents a short circuit, the outside air suction port (61) is provided in one side plate (24) or in the vicinity thereof, and the discharge air blowing port (64) is provided in the other side plate (25), which faces the one side plate, or in the vicinity thereof. Therefore, the distance between the outside air suction port (61) and the discharge air blowing port (64) can be increased by comparison with the configuration in which the outside air suction port (61) and the discharge air blowing port (64) are provided in the same side surface. As a result, it is not necessary to bend either or both of the duct connected to the outside air suction port (61) and the duct connected to the discharge air blowing port (64). As a consequence, the ducts can be easily arranged so as to prevent a short circuit even when stringent restrictions are placed on the installation space, for example, when the ventilation device is installed in the space above the ceiling.

In a specific example, an installation process is assumed in which the duct connected to the outside air suction port (61) is extended to one wall surface of a building, and the duct connected to the discharge air blowing port (64) is extended to the other wall surface positioned on the side opposite that of the one wall surface. In such an example, where the discharge air blowing port (64) is provided in the one side plate (24) in which the outside air suction port (61) is also provided, the duct connected to the discharge air blowing port (64) should be bent in a U-turn shape toward the other wall surface, but in the present configuration the ducts can be arranged substantially linearly, without bending the ducts into the U-turn shape.

Where the suction port (outside air suction port (61) or discharge air suction port (63)) and the blowing port (discharge air blowing port (64) or indoor air supply port (62)) are arranged as in the present configuration, when the path structure is assumed in which the air flows through each path in the arrangement order of the ports, the air first passes through the first element (41) and then passes through the second element (42) in both the air supply path and the air discharge path. In such a configuration, in the first element (41) on the upstream side, the difference in temperature between the outdoor air and indoor air is large, whereas in the second element (42) on the downstream side, the difference in temperature between the outdoor air and indoor air can become extremely small. As a result, the amount of heat exchange in the second element (42) on the downstream side is reduced. Therefore, such a path structure is undesirable from the standpoint of ventilation device performance, and it is impossible to take full advantage of the benefits of providing a plurality of total heat exchange elements.

Accordingly, in the configuration of the reference example, the aforementioned other path has a specific route in order to take full advantage of the benefits of providing the first element (41) and the second element (42) and improve the ventilation device performance. Thus, one of the air supply path (P1) and the air discharge path (P2) has a route such that the air sucked into the case (21) from either one suction port, from among the outside air suction port (61) and the discharge air suction port (63), flows through the first element (41) and then through the second element (42). The other path has a circular route such that the air sucked into the case (21), from the other suction port from among the outside air suction port (61) and the discharge air suction port (63), flows to the other side plate (25) side with respect to the first element (41) through the bypass circuit (B) that does not pass through the first element (41), first passes through the second element (42), and then returns to the one side plate (24) side and passes through the first element (41).

As a result of providing the bypass circuit (B) and creating the circular route in the other path in the above-described manner, it is possible to cause the air to pass first through the second element (42) and then through the first element (41). As a consequence, the difference in temperature between the outdoor air and indoor air is prevented from becoming extremely small and, therefore, it is possible to take full advantage of the benefits of providing the first element (41) and the second element (42) and maintain high performance.

(2) It is preferred that the ventilation device of the reference example be further provided with a first guide plate (51) disposed between the one main plate (22) and the first element (41) and a second guide plate (52) disposed between the one main plate (22) and the second element (42). In such a configuration, it is preferred that the first element (41) and the second element (42) be of a crossflow type having transverse flow passages (F1, F2) extending in the facing direction (D1) of the side plates in which the pair of side plates (24, 25) face each other, and longitudinal flow passages (F3, F4) extending in a facing direction (D2) of the main plates, in which the main plates (22, 23) face each other, that the first guide plate (51) form the bypass circuit (B) preventing the air flowing into the other path from flowing into the longitudinal flow passage (F3) of the first element (41) and guiding this air into the longitudinal flow passage (F4) of the second element (42), and that the second guide plate (52) form a guide path (G) that prevents the air flowing in the other path passing through the longitudinal flow passage (F3) of the first element (41) from flowing again into the longitudinal flow passage (F4) of the second element (42) and guiding this air to the discharge air blowing port (64) or the indoor air supply port (62).

In such a configuration, by arranging the first guide plate (51) between the one main plate (22) and the first element (41) and arranging the second guide plate (52) between the one main plate (22) and the second element (42) when the first element (41) and the second element (42) are of a crossflow type having the transverse flow passages (F1, F2) and the longitudinal flow passages (F3, F4) such as described hereinabove, it is possible to guide the air smoothly along the aforementioned circular route in the other path.

(3) In the ventilation device of the reference example, it is preferred that the first element (41) and the second element (42) have a rectangular parallelepiped shape such that the length direction thereof extends parallel to the one side plate (24) and be arranged adjacent to each other in the facing direction (D1) of the side plates, that the outside air suction port (61) or the discharge air suction port (63), which is the suction port of the one path, be at a position in the one side plate (24) that is offset in the one direction (D3) in the length direction with respect to the first element (41) and the second element (42), and that the discharge air suction port (63) or the outside air suction port (61), which is the suction port of the other path, be at a position in the one side plate (24) that is offset in the other direction (D4) in the length direction with respect to the first element (41) and the second element (42). In such a configuration, it is preferred that the second guide plate (52) be disposed in a posture that is inclined with respect to the length direction of the second element (42) in a manner such that the one end (52*a*) of the second guide plate is positioned in the end portion of the second element (42) in the one direction (D3) or in the vicinity thereof, the other end (52*b*) is positioned in the other direction (D4) with respect to the one end (52*a*), and the distance between the second guide plate and the second element (42) decreases in the direction from the other end (52*b*) toward the one end (52*a*).

In such a configuration, the suction port of the other path having the circular route is positioned in the one side plate (24) with an offset in the other direction (D4) of the length direction with respect to the first element (41) and the second element (42). Therefore, in the longitudinal flow passage (F4) of the second element (42), a comparatively large amount of air flows into the region close to the suction port, that is, to the region in the second element (42) in the other direction (D4) of the length direction. Therefore, the amount of the air of the other path that flows into the longitudinal flow passage (F4) of the second element (42) decreases in the one direction (D3) of the length direction of the second element (42).

Accordingly, since the second guide plate (52) is disposed in the posture inclined in the above-described manner, the distance between the inner surface of the second guide plate (52) and the inlet of the longitudinal flow passage (F4) of the second element (42) decreases along the one direction (D3) of the length direction in which the inflow amount of the air decreases. This is because in the region in the one direction (D3), the adverse effect in terms of pressure loss is small even if the distance to the inner surface of the second guide plate (52) decreases. Further, in the one direction (D3) of the length direction, the gap between the outer surface of the second guide plate (52) and the inner surface of the one main plate (22) can be increased correspondingly to the decrease in the distance between the inner surface of the second guide plate (52) and the second element (42). As a result, it is possible to increase the cross-sectional area of the guide path (G) by which the air in the other path passing through the longitudinal flow passage (F3) of the first element (41) is guided to the blowing port.

In the present configuration, by disposing the second guide plate (52) in the posture inclined in the above-described manner, it is possible to distribute efficiently the cross-sectional areas of the flow passages through which the air flows in the other path and, therefore, the pressure loss in the other path can be reduced.

(4) In the ventilation device of the reference example, it is preferred that the first element (41) and the second element (42) have a rectangular parallelepiped shape such that the length direction thereof extends parallel to the one side plate (24) and be arranged adjacent to each other in the facing direction (D1) of the side plates, that the outside air suction port (61) or the discharge air suction port (63), which is the suction port of the one path, be at a position in the one side plate (24) that is offset in the one direction (D3) in the length direction with respect to the first element (41) and the second element (42), and that the discharge air suction port (63) or the outside air suction port (61), which is the suction port of the other path, be at a position in the one side plate (24) that is offset in the other direction (D4) in the length direction with respect to the first element (41) and the second element (42). In such a configuration, it is preferred that the first guide plate (51) be disposed in a posture that is inclined with respect to the length direction of the first element (41) in a manner such that the one end (51*a*) of the first guide plate is positioned in the end portion of the first element (41) in the other direction (D4) or in the vicinity thereof, the other end (51*b*) is positioned in the one direction (D3) with respect to the one end (51*a*), and the distance between the first guide plate and the first element (41) increases in the direction from the one end (51*a*) toward the other end (51*b*).

In such a configuration, the suction port of the one path is positioned in the one side plate (24) with an offset in the one direction (D3) of the length direction with respect to the first element (41) and the second element (42). Therefore, in the transverse flow passage (F 1) of the first element (41), the air easily flows into the region close to the suction port, that is, to the region in the first element in the one direction (D3) of the length direction.

Accordingly, in the present configuration, since the first guide plate (51) is disposed in the posture inclined in the above-described manner, the amount of air in the other path flowing in the longitudinal flow passage (F3) of the first element (41) that is distributed to the region in the one direction (D3) is larger than that distributed to the region in the other direction (D4) of the length direction where the distance between the outlet of the longitudinal flow passage (F3) and the first guide plate (51) is small. As a result, it is possible to induce efficient heat exchange in the first element (41) between the air in the one path flowing through the transverse flow passage (F1) and the air in the other path flowing through the longitudinal flow passage (F3).

Further, in the other direction (D4) of the length direction, the gap between the outer surface of the first guide plate (51) and the inner surface of the one main plate (22) can be increased correspondingly to the decrease in the distance between the inner surface of the first guide plate (51) and the inlet of the longitudinal flow passage (F3) of the first element (41). As a result, it is possible to increase the cross-sectional area of the bypass circuit (B).

EXPLANATION OF REFERENCE NUMERALS

11 ventilation device
21 case
22 bottom plate (one main plate)
23 top plate (the other main plate)
24 first side plate (one side plate)
25 second side plate (the other side plate)
26 third side plate
27 fourth side plate
41 first element (total heat exchange element)
42 second element (total heat exchange element)
51 first guide plate
52 second guide plate
61 outside air suction port
62 indoor air supply port
63 discharge air suction port
64 discharge air blowing port
B bypass circuit
D1 facing direction of side plates
D2 facing direction of main plates
D3 length direction to one side
D4 length direction to the other side
F1, F2 transverse flow passages
F3, F4 longitudinal flow passages
G guide path
M1 first mixing flow passage
M2 second mixing flow passage
OA outside air suction
SA indoor supplied air
RA discharge air suction
EA discharge air blowing

The invention claimed is:

1. A ventilation device comprising: a case including a pair of main plates disposed opposite each other and a pair of side plates disposed opposite each other and connecting end portions of the pair of main plates; and a first element and a second element in the form of a rectangular parallelepiped that are arranged adjacent to each other in a facing direction of the side plates, in which the pair of side plates face each other, and induce transfer of sensible heat and latent heat between outdoor air and indoor air, wherein the first element and the second element are of a crossflow type provided with transverse flow passages constituted by a plurality of channels formed by fins disposed between barrier plates and extending in the facing direction of the side plates, and longitudinal flow passages constituted by a plurality of through channels formed by fins disposed between barrier plates and extending in a facing direction of the main plates, in which the main plates face each other, the first element and the second element are disposed in postures such that the length directions thereof are parallel to each other, the first element is disposed such that a pair of opposing surfaces which include respective openings for the channels of the longitudinal flow passage is parallel to the one main plate, and the second element is disposed such that a pair of opposing surfaces which include respective openings for the channels of the longitudinal flow passage is parallel to the one main plate, a mixing flow passage formed as a result of the first element and the second element being disposed with a gap therebetween in the facing direction of the side plates is provided between the transverse flow passage of the first element and the transverse flow passage of the second element, a discharge air suction port and a discharge air blowing port are provided in the case, a discharge air path from the discharge air suction port to the discharge air blowing port has a circular route such that air sucked into the case in a first direction from the discharge air suction port flows to the side plate side with respect to the first element through a bypass circuit, passes through the longitudinal flow passage of the second element, and then flows in a second direction opposite to the first direction before passing through the longitudinal flow passage of the first element, an outside air suction port and an indoor air supply port are provided in the case, an air supply path from the outside air suction port to the indoor air supply port has a route such that air passes through the transverse flow passage of the first element and through the transverse flow passage of the second element, and air flowing in the air supply path is sandwiched between an air layer of the discharge air path above the air supply path and an air layer of the discharge air path below the air supply path.

2. The ventilation device according to claim 1, wherein
the first element and the second element are arranged at positions closer to the other main plate than to the one main plate in the facing direction of the main plates, and a second mixing flow passage is provided between the longitudinal flow passage of the first element and the longitudinal flow passage of the second element, and the second mixing flow passage is a space between the other main plate and the first element and the second element.

* * * * *